(12) United States Patent
Liu et al.

(10) Patent No.: US 12,578,491 B2
(45) Date of Patent: Mar. 17, 2026

(54) IMPLICIT FINITE-DIFFERENCE METHOD FOR RESERVOIR IDENTIFICATION

(71) Applicant: SAUDI ARABIAN OIL COMPANY, Dhahran (SA)

(72) Inventors: Hongwei Liu, Dhahran (SA); Hussain J. Salim, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 489 days.

(21) Appl. No.: 18/162,502

(22) Filed: Jan. 31, 2023

(65) Prior Publication Data

US 2024/0210581 A1 Jun. 27, 2024

Related U.S. Application Data

(60) Provisional application No. 63/476,616, filed on Dec. 21, 2022.

(51) Int. Cl.
*G01V 1/28* (2006.01)
*G01V 1/34* (2006.01)

(52) U.S. Cl.
CPC .............. *G01V 1/282* (2013.01); *G01V 1/345* (2013.01)

(58) Field of Classification Search
CPC ............................... G01V 1/282; G01V 1/345
See application file for complete search history.

(56) References Cited

U.S. PATENT DOCUMENTS

| | | | |
|---|---|---|---|
| 8,560,242 B2 | 10/2013 | Etgen et al. | |
| 9,207,343 B2 * | 12/2015 | Koren | ..................... G01V 1/301 |
| 10,241,222 B2 * | 3/2019 | Jiang | ....................... G06F 30/20 |

(Continued)

FOREIGN PATENT DOCUMENTS

| | | |
|---|---|---|
| CN | 108051855 B | 2/2019 |
| CN | 107976710 B | 5/2019 |

OTHER PUBLICATIONS

H. Liu and Y. Luo; "An explicit method to calculate implicit spatial finite differences", Geophysics; vol. 87; No. 2; Mar. 2012; pp. T157-T168 (12 pages).

(Continued)

*Primary Examiner* — Elias Desta
(74) *Attorney, Agent, or Firm* — Osha Bergman Watanabe & Burton LLP

(57) ABSTRACT

Systems and methods are disclosed. The method includes, for each of a plurality of spatial partial differential equations (sPDEs) within a wave equation, determining a linear system of equations using an approximate solution at a plurality of grid nodes. The linear system of equations includes an inverse matrix, a first vector, and a second vector. The method further includes, for each of the plurality of sPDEs, evaluating the inverse matrix by evaluating a first portion of the inverse matrix using a first deconvolution filter and evaluating a second portion of the inverse matrix using a second deconvolution filter. The method further still includes, for each of the plurality of sPDEs, evaluating the first vector using the evaluated inverse matrix and the second vector as well as determining the wavefield using the evaluated first vector for each of the plurality of sPDEs, a velocity model, and the wave equation.

8 Claims, 7 Drawing Sheets

(56)          References Cited

U.S. PATENT DOCUMENTS

2012/0271550 A1    10/2012  Jiang et al.
2015/0276956 A1    10/2015  Khalil et al.

OTHER PUBLICATIONS

D. Kosloff et al.; "Acoustic and elastic numerical wave simulations by recursive spatial derivative operators", Geophysics; vol. 75; No. 6; Nov. 2010; pp. T167-T174 (8 pages).
H. Zhou and G. Zhang; "Prefactored optimized compact finite-difference schemes for second spatial derivatives", Geophyics; vol. 76; No. 5; Sep. 2011; pp. WB87-WB95 (9 pages).
H. Liu and H. Zhang; "Reducing computation cost by Lax-Wendroff methods with fourth-order temporal accuracy", Geophyics; vol. 84; No. 3; May 2019; pp. T109-T119 (11 pages).
H. Liu et al.; "The issues of prestack reverse time migration and solutions with Graphic Processing Unit implementation", Geophysical Prospecting; vol. 60; 2012; pp. 906-918 (13 pages).
L. Hong-Wei et al.; "The Algorithm of High Order Finite Difference Pre-Stack Reverse Time Migration and GPU Implementation", Chinese Journal of Geophyics; vol. 53; No. 4; 2010; pp. 600-610 (11 pages).
X. Fang et al.; "A new implementation of convolutional PML for second-order elastic wave equation", Exploration Geophysics; vol. 53; Issue 5; 2022; pp. 1-16 (16 pages).

* cited by examiner

Figure 2:
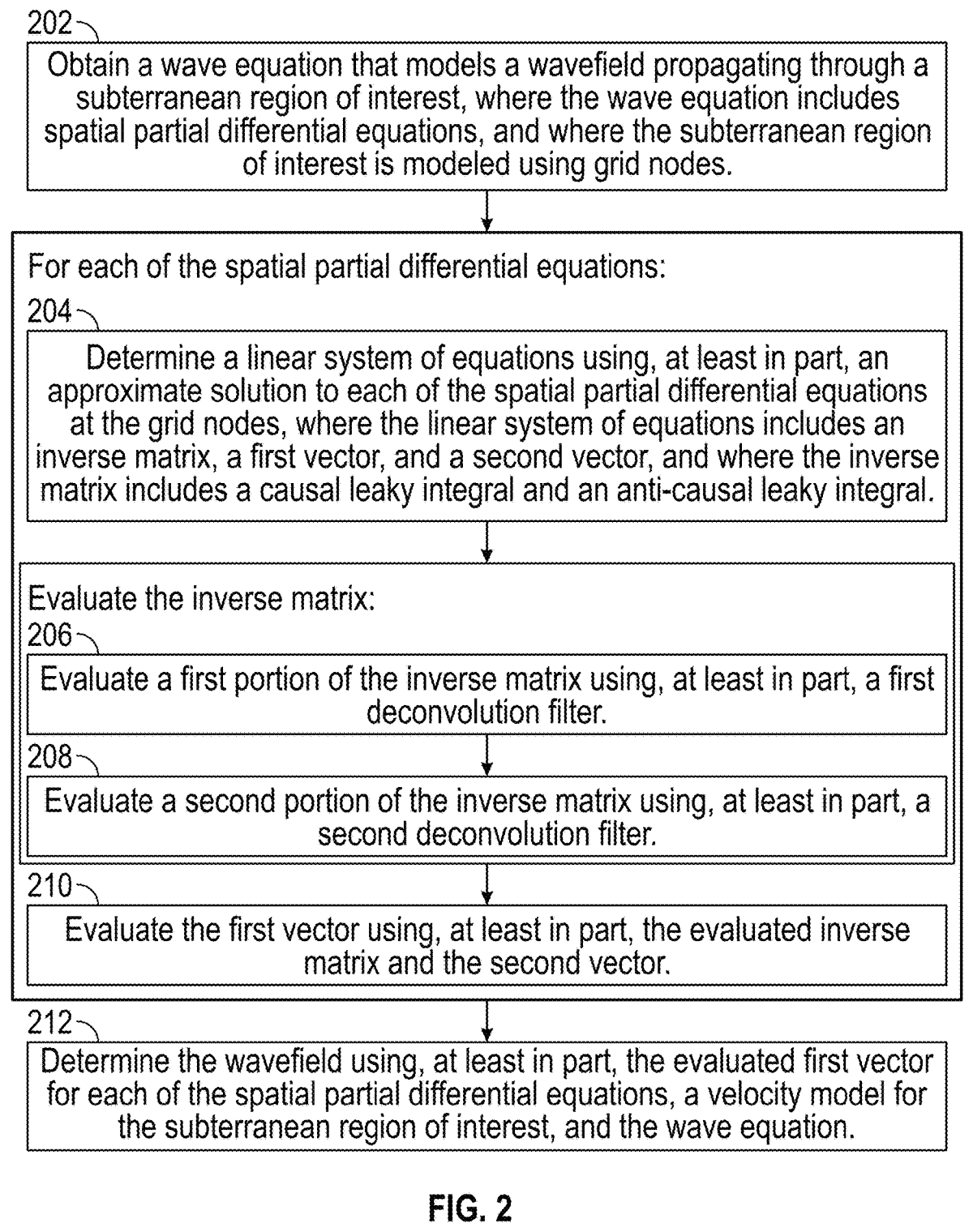

202 —

Obtain a wave equation that models a wavefield propagating through a subterranean region of interest, where the wave equation includes spatial partial differential equations, and where the subterranean region of interest is modeled using grid nodes.

For each of the spatial partial differential equations:

204 —

Determine a linear system of equations using, at least in part, an approximate solution to each of the spatial partial differential equations at the grid nodes, where the linear system of equations includes an inverse matrix, a first vector, and a second vector, and where the inverse matrix includes a causal leaky integral and an anti-causal leaky integral.

Evaluate the inverse matrix:

206 —

Evaluate a first portion of the inverse matrix using, at least in part, a first deconvolution filter.

208 —

Evaluate a second portion of the inverse matrix using, at least in part, a second deconvolution filter.

210 —

Evaluate the first vector using, at least in part, the evaluated inverse matrix and the second vector.

212 —

Determine the wavefield using, at least in part, the evaluated first vector for each of the spatial partial differential equations, a velocity model for the subterranean region of interest, and the wave equation.

IMPLICIT FINITE-DIFFERENCE METHOD FOR RESERVOIR IDENTIFICATION

BACKGROUND

The wave equation may be written as a second-order partial differential equation that may be used to model waves propagating through media. For example, the wave equation may be used to model seismic waves propagating through a subterranean region of interest. Due to the heterogeneity of a typical subterranean region of interest, a finite-difference method may be used to determine an approximate solution to the wave equation. Explicit finite-difference methods are frequently used. However, performance may only increase as operator length increases up to a certain operator length before suffering from the "saturation effect" where performance ceases to increase significantly. Further, other finite-difference methods may be computationally expensive or produce numerical dispersion.

Once an approximate solution to the wave equation is determined, the modeled seismic waves may be used within the seismic processing pipeline. For example, the modeled seismic waves may be used, at least in part, to determine a velocity model that represents the subterranean region of interest. In turn, the velocity model may be used to generate a seismic image that, when displayed, may be used to identify manifestations of a hydrocarbon reservoir within the subterranean region of interest. The manifestations of a hydrocarbon reservoir may then be used to plan a wellbore path that may be drilled to penetrate the hydrocarbon reservoir such that the stored hydrocarbons may be produced to the surface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes, for each of a plurality of spatial partial differential equations (sPDEs) within a wave equation, determining a linear system of equations using an approximate solution at a plurality of grid nodes. The linear system of equations includes an inverse matrix, a first vector, and a second vector. The method further includes, for each of the plurality of sPDEs, evaluating the inverse matrix by evaluating a first portion of the inverse matrix using a first deconvolution filter and evaluating a second portion of the inverse matrix using a second deconvolution filter. The method further still includes, for each of the plurality of sPDEs, evaluating the first vector using the evaluated inverse matrix and the second vector as well as determining the wavefield using the evaluated first vector for each of the plurality of sPDEs, a velocity model, and the wave equation.

In general, in one aspect, embodiments relate to a non-transitory computer-readable memory storing instructions that perform steps executable by a computer processor. The steps include, for each of a plurality of spatial partial differential equations (sPDEs) within a wave equation, determining a linear system of equations using an approximate solution at a plurality of grid nodes. The linear system of equations includes an inverse matrix, a first vector, and a second vector. The steps further include, for each of the plurality of sPDEs, evaluating the inverse matrix by evaluating a first portion of the inverse matrix using a first deconvolution filter and evaluating a second portion of the inverse matrix using a second deconvolution filter. The steps further still include, for each of the plurality of sPDEs, evaluating the first vector using the evaluated inverse matrix and the second vector as well as determining the wavefield using the evaluated first vector for each of the plurality of sPDEs, a velocity model, and the wave equation.

In general, in one aspect, embodiments relate to a system. The system includes a seismic acquisition system configured to obtain a seismic dataset for a subterranean region of interest. The system further includes a seismic processing system configured to, for each of a plurality of spatial partial differential equations (SPDEs) within a wave equation, determine a linear system of equations using an approximate solution at a plurality of grid nodes. The linear system of equations includes an inverse matrix, a first vector, and a second vector. The seismic processing system is further configured to, for each of the plurality of sPDEs, evaluate the inverse matrix by evaluating a first portion of the inverse matrix using a first deconvolution filter and evaluating a second portion of the inverse matrix using a second deconvolution filter. The seismic processing system is further still configured to, for each of the plurality of sPDEs, evaluate the first vector using the evaluated inverse matrix and the second vector as well as determine the wavefield using the evaluated first vector for each of the plurality of sPDEs, a velocity model, and the wave equation. The seismic processing system is yet further still configured to, until a convergence criterion is satisfied, determine an objective function based on the wavefield and the seismic dataset, determine an extremum of the objective function, and determine an updated velocity model based on the extremum and determine a seismic image of the subterranean region of interest using the seismic dataset and the updated velocity model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 2 shows a flowchart in accordance with one or more embodiments.

DETAILED DESCRIPTION

Figure 1:
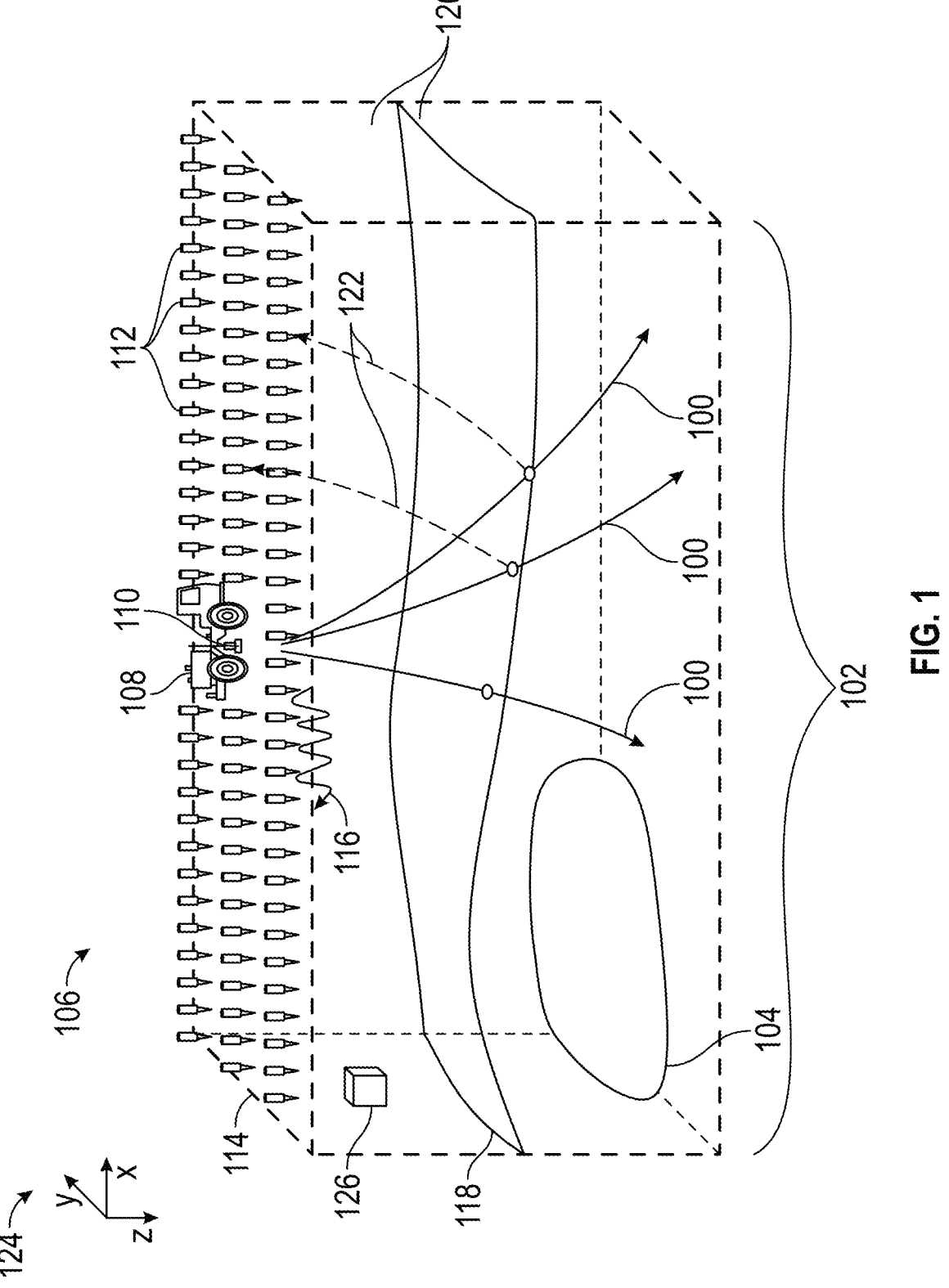
FIG. 1 illustrates seismic waves propagating through a subterranean region of interest in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-second features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a grid node" includes reference to one or more of such nodes.

Terms such as "approximately," "substantially," etc., mean that the recited characteristic, parameter, or value need not be achieved exactly, but that deviations or variations, including for example, tolerances, measurement error, measurement accuracy limitations and other factors second to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-7, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

Methods and systems are disclosed to determine an approximate solution to the wave equation that models seismic waves propagating through a subterranean region of interest. The method includes using deconvolution filters, at least in part, to determine an implicit approximate solution to the spatial partial differential equations (PDE) within the wave equation using a finite-difference method.

Finite-difference methods are routinely used in the modeling of seismic wave propagation and find application in many aspects of seismic data processing, particularly seismic wave propagation velocity analysis and seismic imaging. In turn, seismic imaging is a key step in the determination of the presence and location of hydrocarbon reservoirs, such as oil and gas reservoirs, and determining drilling targets and wellbore trajectories to extract hydrocarbons.

The present disclosure may be an improvement over other finite-difference methods used to determine an approximate solution to spatial PDEs within the wave equation. Other finite-difference methods may suffer from the "saturation effect" where computational performance suffers as the finite-difference operators increase in length beyond a certain threshold. Here, "computational performance" may be the amount of useful work accomplished by a computer and may be quantified in terms of accuracy, efficiency, and/or speed. Further, other finite-difference methods may cause "numerical dispersion" which may lead to poorly modeled seismic waves. Further still, other finite-difference methods may be computationally expensive. However, the present disclosure may mitigate the saturation effect and numerical dispersion while being computationally economical.

FIG. 1 illustrates seismic waves (100) propagating through a subterranean region of interest (102) in accordance with one or more embodiments. The subterranean region of interest (102) may contain a hydrocarbon reservoir (104). In some embodiments, the seismic waves (100) may be emitted and recorded using a seismic acquisition system (106). The seismic acquisition system (106) may include a seismic source (108) located at a seismic source position (110) and a plurality of seismic receivers (112) located on the surface of the earth (114). The seismic source (108) may emit seismic waves (100) into the subterranean region of interest (102) using a dynamite source or seismic vibrator ("vibroseis truck").

Some seismic waves (100) may propagate along the ground surface as surface waves or direct waves (alternatively "ground-roll") (116). Other seismic waves (100) may propagate into the subterranean region of interest (102), reflect (and possibly refract) one or more times at geological boundaries (118) between layers of rock (120), and return to the surface of the earth (114) as reflected seismic waves (122). Still other seismic waves (100) may propagate into the subterranean region of interest (102), refract (and possibly reflect) one or more times at geological boundaries (118) between layers of rock (120), and continue propagating into the subterranean region of interest (102) as refracted seismic waves (not shown).

The seismic source position (110) may be denoted by $(x_s, y_s)$ where x and y represent orthogonal axes (124) on the surface of the earth (114) above the subterranean region of interest (102). Further, the position of each seismic receiver (112) may be denoted by $(x_r, y_r)$. Each seismic receiver (112) may record a time series that represents the amplitude of ground motion at a sequence of discrete times t. The time series may be denoted a "seismic trace." As such, a series of seismic traces may make up a five-dimensional "seismic dataset" denoted by $S(x_s, y_s, x_r, y_r, t)$.

It may be useful to model seismic waves (100) propagating through a subterranean region of interest (102). A person of ordinary skill in the art may refer to the process of modeling seismic waves (100) propagating through the subterranean region of interest (102) as "forward modeling." Forward modeling may be a part of the process of "inversion" which may iteratively update a geological model, such as a velocity model, of the subterranean region of interest (102). Further uses of modeling seismic waves (100) propagating through a subterranean region of interest (102) also include "reverse time migration" which may correct the position of seismic traces within a seismic dataset.

Seismic waves (100) propagating through a subterranean region of interest (102) may be modeled using a second-order PDE known as the "wave equation." The wave equation may model the seismic waves (100) (hereinafter also "wavefield") propagating through the subterranean region of interest (102) as:

$$\frac{\partial^2 p}{\partial t^2} = v^2 \left( \frac{\partial^2 p}{\partial x^2} + \frac{\partial^2 p}{\partial y^2} + \frac{\partial^2 p}{\partial z^2} \right) + s(x, y, z, t), \qquad \text{Equation (1)}$$

where $p(x, y, z, t)$ denotes the wavefield (100), $v(x,y,z)$ is the wavefield propagation velocity (hereinafter also "velocity model"), and $s(x, y, z, t)$ is the source term where the wavefield (100) is emitted from (i.e., the seismic source position (110)). The wave equation may model seismic waves (100) at discrete (x,y,z) positions (126) within the subterranean region of interest (102). Hereinafter, each discrete (x,y,z) position (126) is modeled as a grid node denoted $x_i$. While Equation (1) expresses the wave equation in three spatial dimensions, x, y, and z, the wave equation may alternatively be expressed in two spatial dimensions. Further, while Equation (1) may model seismic waves (100) as acoustic waves, a person of ordinary skill in the art will appreciate that seismic waves (100) may be modeled as elastic waves without departing from the scope of this disclosure. Further still, while Equation (1) shows a second-order wave equation, a person of ordinary skill in the art will appreciate that a first-order wave equation may be used without departing from the scope of this disclosure.

The wavefield (100) is a function of space and time. To model the wavefield (100) using the wave equation, each second-order spatial derivative term in the PDE $$\left( \text{i.e., } \frac{\partial^2 p}{\partial x^2}, \frac{\partial^2 p}{\partial y^2}, \text{ and } \frac{\partial^2 p}{\partial z^2} \right)$$

(hereinafter also "spatial PDE," "sPDE," or simply "term") may be determined separately using a finite-difference method. Further, each term may be determined for the plurality of grid nodes that represents the subterranean region of interest (102).

A finite-difference method may be explicit or implicit. Explicit finite-difference methods may suffer from the saturation effect. Implicit finite-difference methods may yield similar solutions relative to explicit finite-difference methods but with shorter operator lengths.

For example, an implicit finite-difference method that provides an approximate solution to a spatial PDE may be:

$$D_i^2 + \sum_{m=1}^{M} b_m \left( D_{i+m}^2 + D_{i-m}^2 \right) = \sum_{n=1}^{N} a_n \frac{(p_{i+n} - 2p_i + p_{i-n})}{(nh)^2}, \qquad \text{Equation (2)}$$

where $D_i^2$ may be the spatial PDE $$\frac{\partial^2 p}{\partial x^2}, \frac{\partial^2 p}{\partial y^2} \text{ or } \frac{\partial^2 p}{\partial z^2}$$

at grid node $x_i$ with grid interval h. While the grid interval h implies the plurality of grid nodes are equally spaced, the plurality of grid nodes may alternatively be unequally spaced. Equation (2) may be referred to as a "recursive implicit second-derivative approximate solution" or, simply, an "approximate solution."

A series of mathematical operations may be performed beginning with Equation (2) to evaluate an approximate solution to each spatial PDE within the wave equation. Following evaluation of the approximate solution to each spatial PDE within the wave equation, the approximate solutions may be used within Equation (1) to model the wavefield $p(x, y, z, t)$. The series of mathematical operations that may be used to determine an approximate solution to a spatial PDE will now be described below.

Keeping with Equation (2), M and N may each be any positive integer. The integers chosen for M and N may be used to further describe the implicit finite-difference method as the "N-M method." For example, in some embodiments, M=2 and N=4. In these embodiments, Equation (2) may be expanded to:

$$\beta D_{i-2}^2 + \alpha D_{i-1}^2 + D_i^2 + \alpha D_{i+1}^2 + \beta D_{i+2}^2 = \qquad \text{Equation (3)}$$
$$a \frac{p_{i+1} - 2p_i + p_{i-1}}{h^2} + b \frac{p_{i+2} - 2p_i + p_{i-2}}{4h^2} +$$
$$c \frac{p_{i+3} - 2p_i + p_{i-3}}{9h^2} + d \frac{p_{i+4} - 2p_i + p_{i-4}}{16h^2},$$

and described as the "4-2 method." However, a person of ordinary skill in the art will appreciate that any positive integer may be chosen for M and N without departing from the scope of this disclosure.

The coefficients in Equation (3) are generically denoted as $b_1 = \alpha$, $b_2 = \beta$, $a_1 = a$, $a_2 = b$, $a_3 = C$, and $a_4 = d$. The coefficients may be determined by applying Taylor expansion at grid node $x_i$ and setting the coefficients of $D_i^{2k}(k=1, 2, \dots)$ equal to one other. In these embodiments, the following relations may then be formed and used to determine the six coefficients:

$$a + b + c + d = 1 + 2\alpha + 2\beta, \qquad \text{Equation (4)}$$

$$a + 2^2 b + 3^2 c + 4^2 d = \frac{4!}{2!}(\alpha + 2^2 \beta), \qquad \text{Equation (5)}$$

$$a + 2^4 b + 3^4 c + 4^4 d = \frac{6!}{4!}(\alpha + 2^4 \beta), \qquad \text{Equation (6)}$$

$$a + 2^6 b + 3^6 c + 4^6 d = \frac{8!}{6!}(\alpha + 2^6 \beta), \qquad \text{Equation (7)}$$

$$a + 2^8 b + 3^8 c + 4^8 d = \frac{10!}{8!}(\alpha + 2^8 \beta), \text{ and} \qquad \text{Equation (8)}$$

$$a + 2^{10} b + 3^{10} c + 4^{10} d = \frac{12!}{10!}(\alpha + 2^{10} \beta). \qquad \text{Equation (9)}$$

However, a person of ordinary skill in the art will appreciate that relations other than Equations (4)-(9) may be used to determine the coefficients of Equation (2) if different positive integers are chosen for M and N.

Returning to Equation (3), Equation (3) may be determined for each of the plurality of grid nodes that represents the subterranean region of interest (102). In turn, Equation (3) for the plurality of grid nodes may be re-written as a system of linear equations generically denoted:

$$AX = b, \qquad \text{Equation (10)}$$

where $X=D^2$ (i.e., the spatial PDE of interest for the plurality of grid nodes), b is the right-hand side of Equation (3) for the plurality of grid nodes that includes the coefficients $a_n$, and A includes the coefficients $b_m$ from the left-hand side of Equation (3) for the plurality of grid nodes. Hereinafter, A may be referred to as the "matrix," X may be referred to as the "first vector," and b may be referred to as the "second vector."

A z-transform may be applied to matrix A to convert matrix A into the complex frequency-domain z. Following application of the z-transform, A at grid location $x_i$ may be written as:

$$1 + \alpha(z + z^{-1}) + \beta(z^2 + z^{-2}) = z^{-2}(\beta z^4 + \alpha z^3 + z^2 + \alpha z + \beta). \quad \text{Equation (11)}$$

Equation (11) may then be factorized as:

$$1 + \alpha(z + z^{-1}) + \beta(z^2 + z^{-2}) = \quad \text{Equation (12)}$$
$$\beta(z - z_1)(1 - z_1^{-1}z^{-1})(z - z_3)(1 - z_3^{-1}z^{-1}) =$$
$$\beta z_1^{-1}z_3^{-1}(1 - z_1 z)(1 - z_1 z^{-1})(1 - z_3 z)(1 - z_3 z^{-1}).$$

Based on Equation (12), $A^{-1}$ (hereinafter the "inverse matrix" of the matrix A) may be written as:

$$A^{-1} = U^{-1}L^{-1} = \quad \text{Equation (13)}$$
$$\left(L^{-1}\right)^T L^{-1} = \frac{1}{\beta z_1^{-1} z_3^{-1}(1 - z_1 z)(1 - z_1 z^{-1})(1 - z_3 z)(1 - z_3 z^{-1})},$$
$$\text{where } \frac{1}{(1 - z_1 z)} \text{ and } \frac{1}{(1 - z_3 z)}$$

are causal leaky integrals and $$\frac{1}{\left(1 - z_1 z^{-1}\right)} \text{ and } \frac{1}{\left(1 - z_3 z^{-1}\right)}$$

are anti-causal leaky integrals. While the causal and anti-causal leaky integrals may be determined recursively, to do so may be computationally expensive. To be computationally economical, deconvolution filters may be used to ultimately determine the inverse matrix $A^{-1}$ instead.

To use deconvolution filters, Equation (13) may be re-arranged as:

$$A^{-1} = \left(L^{-1}\right)^T L^{-1} = \frac{1}{\beta z_1^{-1} z_3^{-1}\left(1 - (z_1 + z_3)z + z_1 z_3 z^2\right)}, \quad \text{Equation (14)}$$
$$\left(1 - (z_1 + z_3)z^{-1} + z_1 z_3 z^{-2}\right)$$
$$\text{where :}$$

$$L^{-1} = \sqrt{\frac{z_1 z_3}{\beta}} \frac{1}{\left(1 - (z_1 + z_3)z + z_1 z_3 z^2\right)}, \text{ and} \quad \text{Equation (15)}$$

$$\left(L^{-1}\right)^T = \sqrt{\frac{z_1 z_3}{\beta}} \frac{1}{\left(1 - (z_1 + z_3)z^{-1} + z_1 z_3 z^{-2}\right)}. \quad \text{Equation (16)}$$

To determine $L^{-1}$ using Equation (15) and $(L^{-1})^T$ using Equation (16), assume the spatial PDE of interest is $$\frac{\partial^2 p}{\partial x^2}$$

and that seven grid nodes extend along the x-direction. In this case, $Ly=x$ may be written in matrix format as:

$$\sqrt{\frac{z_1 z_3}{\beta}} \begin{bmatrix} 1 & 0 & 0 & 0 & 0 & 0 & 0 \\ a_1 & 1 & 0 & 0 & 0 & 0 & 0 \\ a_2 & a_1 & 1 & 0 & 0 & 0 & 0 \\ 0 & a_2 & a_1 & 1 & 0 & 0 & 0 \\ 0 & 0 & a_2 & a_1 & 1 & 0 & 0 \\ 0 & 0 & 0 & a_2 & a_1 & 1 & 0 \\ 0 & 0 & 0 & 0 & a_2 & a_1 & 1 \end{bmatrix} \begin{bmatrix} y_1 \\ y_2 \\ y_3 \\ y_4 \\ y_5 \\ y_6 \\ y_7 \end{bmatrix} = \begin{bmatrix} x_1 \\ x_2 \\ x_3 \\ x_4 \\ x_5 \\ x_6 \\ x_7 \end{bmatrix}, \quad \text{Equation (17)}$$

where $a_1 = -(Z_1 + Z_3)$ and $a_2 = Z_1 Z_3$. Here, Equation (17) is the "first deconvolution filter." Equation (17) may then be determined recursively using forward substitution by the following formula:

$$y_i = x_i - a_1 y_{i-1} - a_2 y_{i-2}. \quad \text{Equation (18)}$$

Further, $L^T y = x$ may be written in matrix format as:

$$\sqrt{\frac{z_1 z_3}{\beta}} \begin{bmatrix} 1 & a_1 & a_2 & 0 & 0 & 0 & 0 \\ 0 & 1 & a_1 & a_2 & 0 & 0 & 0 \\ 0 & 0 & 1 & a_1 & a_2 & 0 & 0 \\ 0 & 0 & 0 & 1 & a_1 & a_2 & 0 \\ 0 & 0 & 0 & 0 & 1 & a_1 & a_2 \\ 0 & 0 & 0 & 0 & 0 & 1 & a_1 \\ 0 & 0 & 0 & 0 & 0 & 0 & 1 \end{bmatrix} \begin{bmatrix} y_1 \\ y_2 \\ y_3 \\ y_4 \\ y_5 \\ y_6 \\ y_7 \end{bmatrix} = \begin{bmatrix} x_1 \\ x_2 \\ x_3 \\ x_4 \\ x_5 \\ x_6 \\ x_7 \end{bmatrix}. \quad \text{Equation (19)}$$

Here, Equation (19) is the "second deconvolution filter." Equation (19) may then be determined recursively using backward substitution by the following formula:

$$y_i = x_i - a_1 y_{i+1} - a_2 y_{i+2}. \quad \text{Equation (20)}$$

A person of ordinary skill in the art will appreciate that the example presented above is one simplified version of deconvolution filters. In practice, tens to thousands of grid nodes may extend along the x-, y-, and/or z-direction.

Once $L^{-1}$ and $(L^{-1})^T$ are determined using deconvolution filters, $L^{-1}$ and $(L^{-1})^T$ may be used to determine the inverse matrix $A^{-1}$ using Equation (14). The first vector X (i.e., the spatial PDE of interest for the plurality of grid nodes) may then be determined using the inverse matrix $A^{-1}$ and the second vector b where $X = A^{-1}b$.

FIG. 2 shows a flowchart in accordance with one or more embodiments. The flowchart describes a method that may be used to model a wavefield (100) propagating through a subterranean region of interest (102).

In step 202, a wave equation is obtained. The wave equation is a second-order PDE that may be used to model a wavefield (100) propagating through a subterranean region of interest (102). The wave equation includes a plurality of spatial PDEs. The spatial dimensionality of the subterranean region of interest (102) may be the number of spatial PDEs within the wave equation. For example, the three-dimensional wave equation presented in Equation (1) includes three spatial PDEs, $$\frac{\partial^2 p}{\partial x^2}, \frac{\partial^2 p}{\partial y^2} \text{ and } \frac{\partial^2 p}{\partial z^2},$$

and may be used to model a wavefield (100) propagating through a three-dimensional subterranean region of interest (102). Further, the subterranean region of interest (102) is modeled using a plurality of grid nodes. Each grid node may represent a discrete position (126) within the subterranean region of interest (102).

Steps 204, 206, 208, and 210 are performed for each spatial PDE within the wave equation in series or in parallel.

In step 204, a linear system of equations is determined. The linear system of equations may take the form of AX=b as shown in Equation (10). To determine the linear system of equations, a finite-difference method may be used to define an approximate solution to the spatial PDE of interest at each grid node. In some embodiments, the approximate solution at each grid node may be in the form of Equation (2). Any positive integer may be selected for M and N within Equation (2). Further, the coefficients $b_m$ and $a_n$ may be pre-determined. For example, if M=2 and N=4, Equation (2) may be written in expanded form as shown by Equation (3). Further, Equations (4)-(9) may be used to determine the coefficients $b_m$ and $a_n$. A person of ordinary skill in the art will appreciate that any positive integer may be selected for M and N each of which will dictate the number of terms on either side of Equation (2). A person of ordinary skill in the art will also appreciate that relations other than Equations (4)-(9) may be used to determine the coefficients $b_m$ and $a_n$. The approximate solution to the spatial PDE of interest for the plurality of grid nodes may then be re-arranged into the linear system of equations.

While the linear system of equations may take the form of Equation (10), a person of ordinary skill in the art will appreciate that the linear system of equations may alternatively take the form of:

$$X = A^{-1} b, \qquad\qquad \text{Equation (21)}$$

where, to reiterate, X is the first vector, b is the second vector, and $A^{-1}$ is the inverse matrix.

In some embodiments, a z-transform may be applied to matrix A to convert matrix A into the complex frequency-domain z. In these embodiments, the inverse matrix $A^{-1}$ may include one or more causal leaky integrals and one or more anti-causal leaky integrals as shown in Equation (13). Note that causal and anti-causal leaky integrals are recursive operators. Here, the term "recursive" or "recursion" is used to describe an operator that calls itself.

In steps 206 and 208, the inverse matrix $A^{-1}$ is evaluated. Portions of the inverse matrix $A^{-1}$ may be evaluated separately using, at least in part, deconvolution filters. The inverse matrix $A^{-1}$ shown in Equation (13) may be re-arranged such that $A^{-1}=(L^{-1})^T L^{-1}$ as shown in Equation (14). Here, $L^{-1}$ may be a "first portion" of the inverse matrix $A^{-1}$ and $(L^{-1})^T$ may be a "second portion" of the inverse matrix $A^{-1}$.

In step 206, the first portion $L^{-1}$ of the inverse matrix $A^{-1}$ may be evaluated by applying forward substitution to the first deconvolution filter in the form of Ly=x. A simplified example is described above relative to Equations (17) and (18).

In step 208, the second portion $(L^{-1})^T$ of the inverse matrix $A^{-1}$ may be evaluated by applying backward substitution to the second deconvolution filter in the form of $L^T y = x$. A simplified example is described above relative to Equations (19) and (20).

The evaluated first portion $L^{-1}$ determined in step 206 and the evaluated second portion $(L^{-1})^T$ determined in step 208 may then be used to determine the evaluated inverse matrix $A^{-1}$ where, again, $A^{-1}=(L^{-1})^T L^{-1}$ as shown in Equation (14).

In step 210, the first vector X is evaluated using the evaluated inverse matrix $A^{-1}$ and the second vector b using Equation (21). Recall that the first vector X includes the approximate solution to the spatial PDE of interest for the plurality of grid nodes that represents the subterranean region of interest (102).

In step 212, the modeled wavefield p(x,y,z,t) is determined. Returning to the wave equation presented in Equation (1), the spatial PDEs, $$\frac{\partial^2 p}{\partial x^2}, \frac{\partial^2 p}{\partial y^2}, \text{ and } \frac{\partial^2 p}{\partial z^2},$$

are now determined for the plurality of grid nodes in the form of the first vectors X. Thus, the first vector X for each spatial PDE may be input into Equation (1) along with a velocity model v(x,y,z) and a source term s(x,y,z,t). In some embodiments, the modeled wavefield p(x,y,z,t) may then be determined using Equation (1) by second-order time stepping. Further, in some embodiments, the Lax-Wendroff fourth-order method may be used to reduce temporal dispersion.

Figure 3:
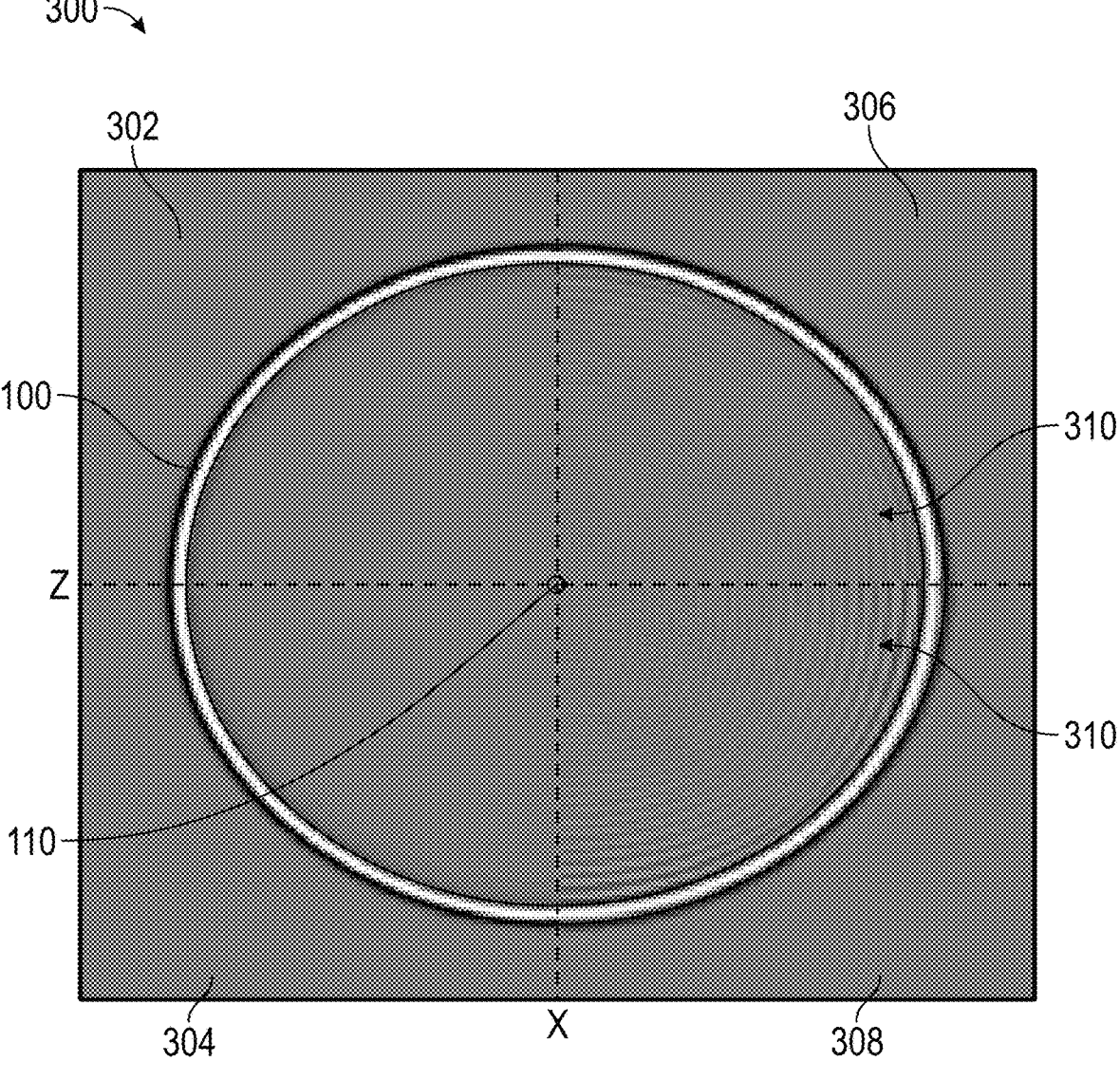
FIG. 3 illustrates modeled seismic waves in accordance with one or more embodiments.

FIG. 3 illustrates a snapshot of modeled seismic waves (100) propagating through homogeneous media (300) in accordance with one or more embodiments. Each quadrant in FIG. 3 shows seismic waves (100) modeled using the wave equation where different finite-difference methods are used. The finite-difference method known as the "pseudospectral method" is used to model the seismic waves (100) shown in the top-left quadrant (302). The finite-difference method described in the present disclosure is used to model the seismic waves (100) shown in the bottom-left quadrant (304). The finite-difference method known as the "explicit finite-difference $16^{th}$ order method" is used to model the seismic waves (100) shown in the top-right quadrant (306). The finite-difference method known as the "explicit finite-difference $8^{th}$ order method" is used to model the seismic waves (100) shown in the bottom-right quadrant (308). For reference, the seismic source position (110) where seismic waves (100) are emitted from is shown in the center of the homogeneous media (300).

In comparing the four finite-difference methods in FIG. 3, the explicit finite-difference $16^{th}$ order method shown in the top-right quadrant (306) and the explicit finite-difference $8^{th}$ order method shown in the bottom-right quadrant (308) present numerical dispersion (310). While the pseudospectral method shown in the top-left quadrant (302) may provide an acceptable solution as well as little-to-no numerical dispersion, the pseudospectral method may be computationally expensive. The method described in the present disclosure shown in the bottom-left quadrant (304) may present little-to-no numerical dispersion while also being computationally economical. Note that details related to the pseudospectral method, explicit finite-difference $8^{th}$ order method, and explicit finite-difference $16^{th}$ order method may be found in Liu and Luo's 2021 paper "*An Explicit Method to Calculate Implicit Spatial Finite Differences*" published in Geophysics.

Figures 4A, 4B, 4C, 4D:
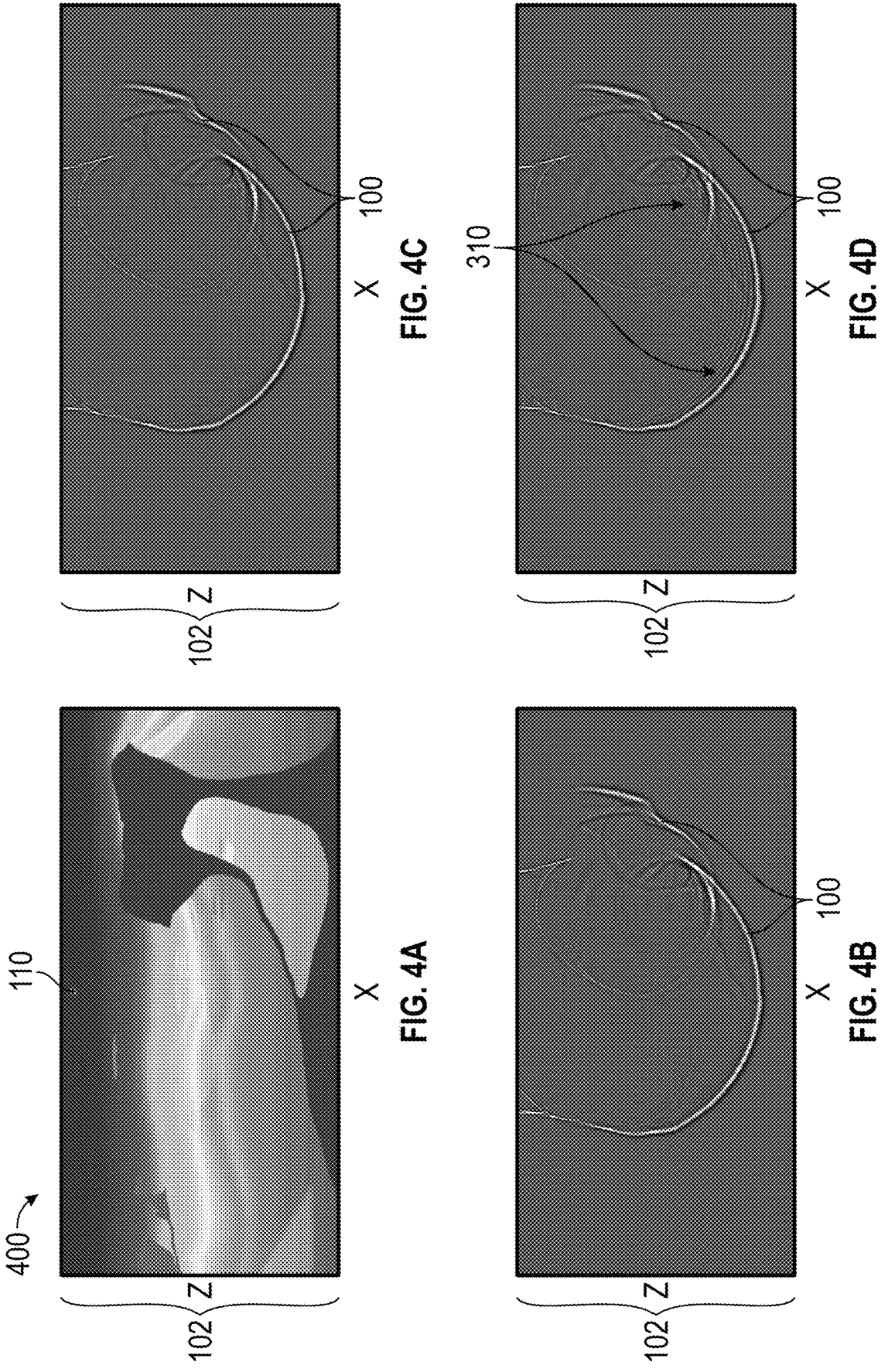
FIG. 4A illustrates a velocity model in accordance with one or more embodiments.
FIGS. 4B-4D illustrate modeled seismic waves in accordance with one or more embodiments.

FIG. 4A illustrates a velocity model (400) that characterizes a two-dimensional subterranean region of interest (102) in accordance with one or more embodiments. For reference, the seismic source position (110) is in the top center of the velocity model (400). FIGS. 4B through 4D each illustrate a snapshot of modeled seismic waves (100) propagating through the subterranean region of interest (102) using the wave equation where different finite-difference methods are used. FIG. 3B illustrates modeled seismic waves (100) propagating through the subterranean region of interest (102) using the finite-difference method described in the present disclosure. FIG. 3C illustrates modeled seismic waves (100) propagating through the subterranean region of interest (102) using the pseudospectral method. FIG. 3D illustrates modeled seismic waves (100) propagating through the subterranean region of interest (102) using the explicit finite-difference $8^{th}$ order method.

Similar to FIG. 3, the explicit finite-difference $8^{th}$ order method shown in FIG. 4D presents numerical dispersion (310) while the pseudospectral method shown in FIG. 4C and the method described in the present disclosure shown in FIG. 4B present little-to-no numerical dispersion.

The method described in FIG. 2 may be generically described as forward modeling. In some embodiments, the process described in FIG. 2 may be used within the process of inversion. Inversion may be an iterative process that relies on an objective function. In some embodiments, the objective function may compare the modeled wavefield (100) determined using the flowchart in FIG. 2 with a seismic dataset obtained for the subterranean region of interest (102) using a seismic acquisition system (106). An extremum of the objective function may then be determined and used, at least in part, to update a geological model, such as a velocity model (400), of the subterranean region of interest (102). In turn, for example, the updated velocity model (400), may be used within the wave equation of Equation (1) to determine an updated modeled wavefield (100). The updated modeled wavefield (100) may again be compared to the seismic dataset using the objective function. This process may be repeated until a convergence criterion is satisfied and the velocity model (400), or other geological model, is considered to adequately characterize the subterranean region of interest (102).

Once the updated velocity model (400) is considered to adequately characterize the subterranean region of interest (102), the seismic dataset and the updated velocity model (400) may be used, at least in part, to determine a seismic image. The seismic image may be used to identify a depth of a hydrocarbon reservoir (104) if a hydrocarbon reservoir (104) exists within the subterranean region of interest (102).

If a depth of a hydrocarbon reservoir (104) is identified within the subterranean region of interest (102), a wellbore planning system may be used to plan a wellbore path through the subterranean region of interest (102) to penetrate the hydrocarbon reservoir (104). A drilling system may then be used to drill the planned wellbore path to penetrate the hydrocarbon reservoir (104) and produce hydrocarbons from the hydrocarbon reservoir (104) to the surface of the earth (114).

Figure 5:
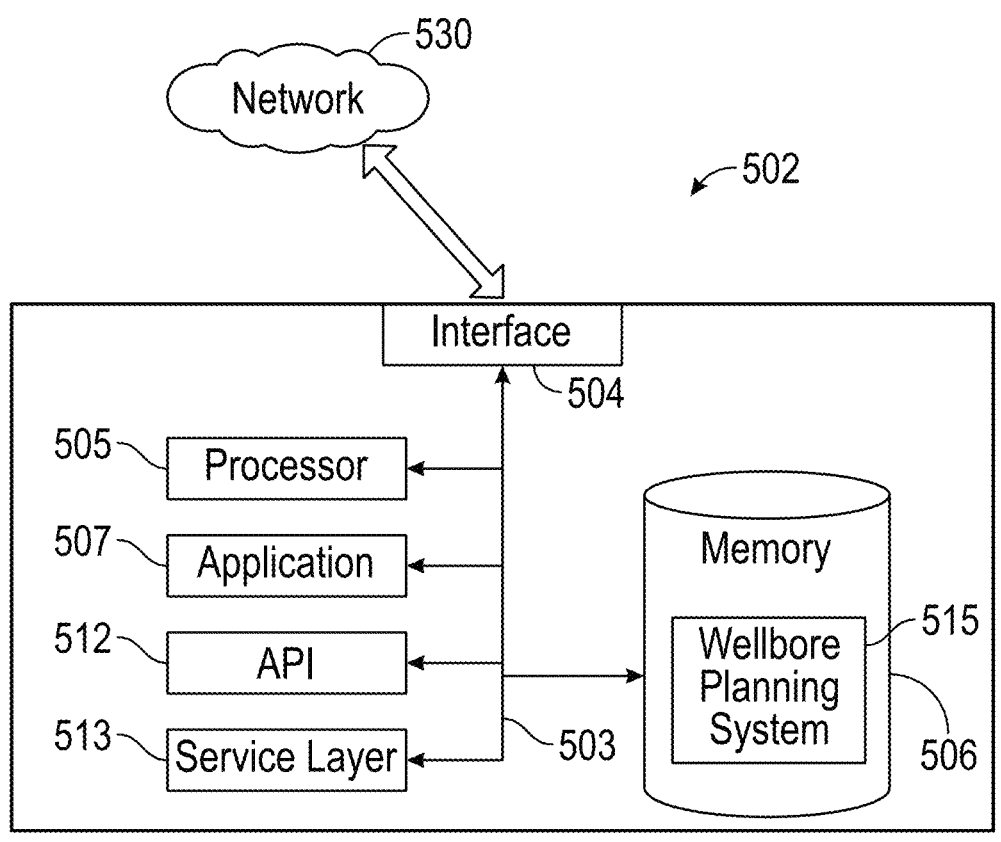
FIG. 5 illustrates a computer system in accordance with one or more embodiments.

The method illustrated in FIG. 2 as well as inversion may be performed on a seismic processing system. Further, the seismic image may be displayed and manipulated on a seismic interpretation workstation. Turning to FIG. 5, FIG. 5 illustrates a generic computer (502) in accordance with one or more embodiments. The computer (502) may be specifically configured for seismic processing and denoted a seismic processing system. Alternatively, the computer (502) may be specifically configured for seismic interpretation and denoted a seismic interpretation workstation. The computer (502) is intended to depict any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include an input device, such as a keypad, keyboard, touch screen, or other device that can accept user information, and an output device that displays information, including digital data, visual or audio information (or a combination of both), or a graphical user interface. Specifically, a seismic interpretation workstation may include a robust graphics card for the detailed rendering of the seismic image that may be displayed and manipulated in a virtual reality system using 3D goggles, a mouse, or a wand to identify a depth of a hydrocarbon reservoir (104).

The computer (502) can serve in a role as a client, network component, server, database, or any other component (or a combination of roles) of a computer system (502) as required for seismic processing and seismic interpretation. The illustrated computer system (502) is communicably coupled with a network (530). For example, a seismic processing system and a seismic interpretation workstation may be communicably coupled using a network (530). In some implementations, one or more components of each computer system (502) may be configured to operate within environments, including cloud-computing-based, local, global, or other environment (or a combination of environments).

At a high level, the computer system (502) is an electronic computing device operable to receive, transmit, process, store, and/or manage data and information associated with seismic processing and seismic interpretation. According to some implementations, the computer system (502) may also include or be communicably coupled with an application server, e-mail server, web server, caching server, streaming data server, business intelligence (BI) server, or other server (or a combination of servers).

Because seismic processing and seismic interpretation may not be sequential, the computer system (502) can receive requests over network (530) from other computer systems (502) or another client application and respond to the received requests by processing the requests appropriately. In addition, requests may also be sent to the computer system (502) from internal users (for example, from a command console or by other appropriate access method), external or third-parties, other automated applications, as well as any other appropriate entities, individuals, systems, or computer systems (502).

Each of the components of the computer system (502) can communicate using a system bus (503). In some implementations, any or all of the components of each computer system (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to each computer system (502) or other components (whether or not illustrated) that are communicably coupled to each computer system (502). The functionality of each computer system (502) may be accessible for all service consumers using this service layer (513). Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of each computer system (502), alternative implementations may illustrate the API (512) or the service layer (513) as stand-alone components in relation to other components of each computer system (502) or other components (whether or not illustrated) that are communicably coupled to each computer system (502). Moreover, any or all parts of the API (512) or the service layer (513) may be implemented as child or sub-modules of another software module, enterprise application, or hardware module without departing from the scope of this disclosure.

The computer system (502) includes an interface (504). Although illustrated as a single interface (504) in FIG. 5, two or more interfaces (504) may be used according to particular needs, desires, or particular implementations of each computer system (502). The interface (504) is used by each computer system (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer system (502) includes at least one computer processor (505). Generally, a computer processor (505) executes any instructions, algorithms, methods, functions, processes, flows, and procedures as described in the instant disclosure. A computer processor (505) may be a central processing unit (CPU) and/or a graphics processing unit (GPU). A modeled wavefield (100) and a seismic dataset may be hundreds of terabytes in size. To efficiently model the wavefield (100) and process the seismic dataset, a seismic processing system may consist of an array of CPUs with one or more subarrays of GPUs attached to each CPU. Further, tape readers or high-capacity hard-drives may be connected to the CPUs using wide-band system buses (503).

The computer system (502) also includes a memory (506) that stores data and software for the computer system (502) or other components (or a combination of both) that can be connected to the network (530). For example, the memory (506) may store a wellbore planning system (515) in the form of software that is used to plan a wellbore path. Although illustrated as a single memory (506) in FIG. 5, two or more memories may be used according to particular needs, desires, or particular implementations of the computer system (502) and the described functionality. While memory (506) is illustrated as an integral component of each computer system (502), in alternative implementations, memory (506) can be external to each computer system (502).

The application (507) is an algorithmic software engine providing functionality according to particular needs, desires, or particular implementations of the computer system (502), particularly with respect to functionality described in this disclosure. For example, application (507) can serve as one or more components, modules, applications, etc. Further, although illustrated as a single application (507), the application (507) may be implemented as multiple applications (507) on each computer system (502). In addition, although illustrated as integral to each computer system (502), in alternative implementations, the application (507) can be external to each computer system (502).

There may be any number of computers (502) associated with, or external to, a seismic processing system and a seismic interpretation workstation, where each computer system (502) communicates over network (530). Further, the term "client," "user," and other appropriate terminology may be used interchangeably as appropriate without departing from the scope of this disclosure. Moreover, this disclosure contemplates that many users may use the computer system (502), or that one user may use multiple computer systems (502).

Figure 6:
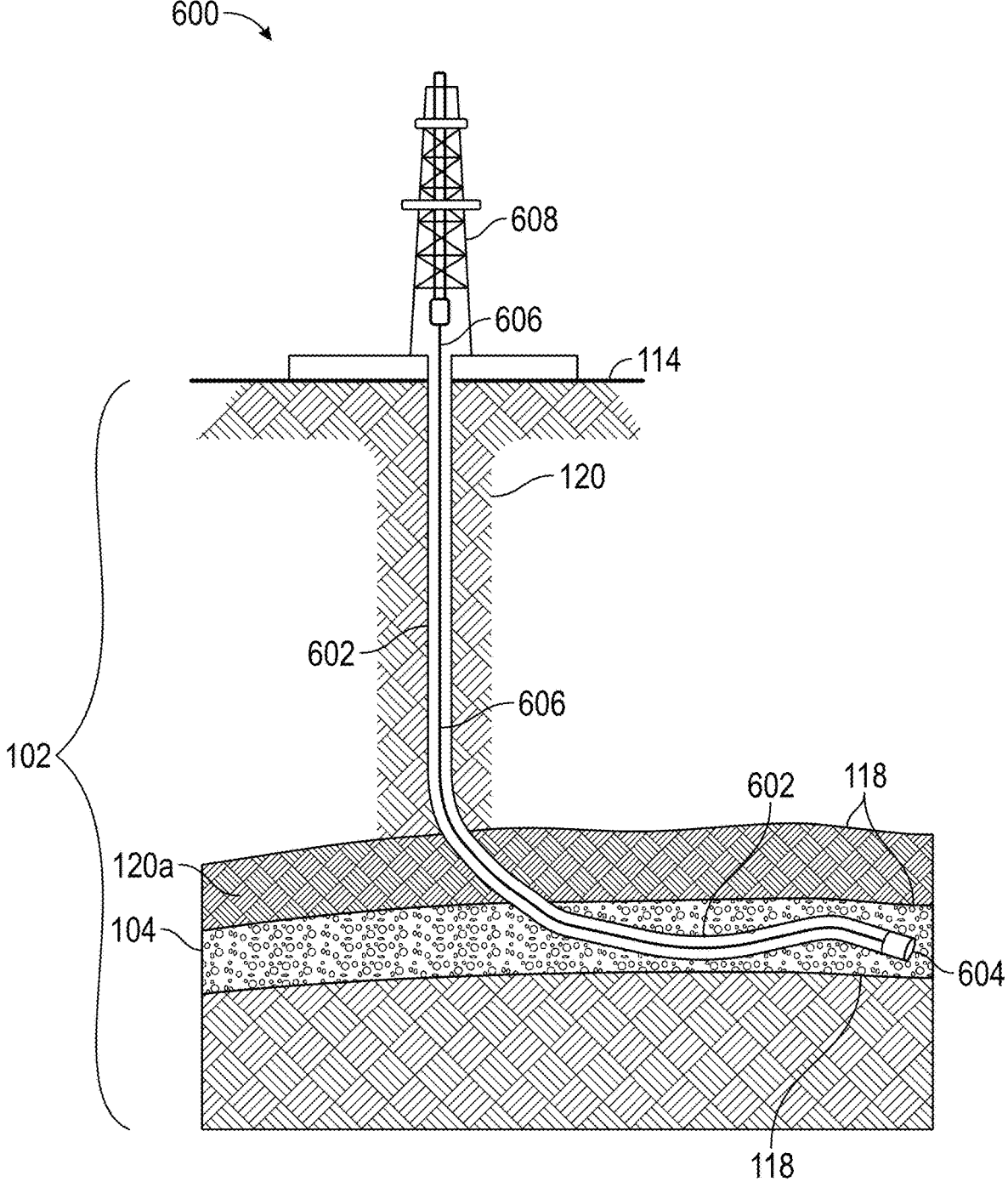
FIG. 6 illustrates a drilling system in accordance with one or more embodiments.

FIG. 6 illustrates a drilling system (600) in accordance with one or more embodiments. Once a wellbore path has been planned using the wellbore planning system (515), the planned wellbore path may be transferred to the drilling system (600). The drilling system (600) may then drill a wellbore (602) along the planned wellbore path to penetrate the hydrocarbon reservoir (104) within the subterranean region of interest (102). The wellbore (602) may be drilled using a drill bit (604) attached to a drillstring (606) further attached to a drill rig (608), where the drill rig (608) is located on the surface of the earth (114). The wellbore (602) may traverse layers of rock (120), including one or more cap-rock layers (120a), and geological boundaries (118) to ultimately penetrate the hydrocarbon reservoir (104). Once the wellbore (602) is drilled and completed, hydrocarbons may be produced from the hydrocarbon reservoir (104) to the surface of the earth (114).

Figure 7:
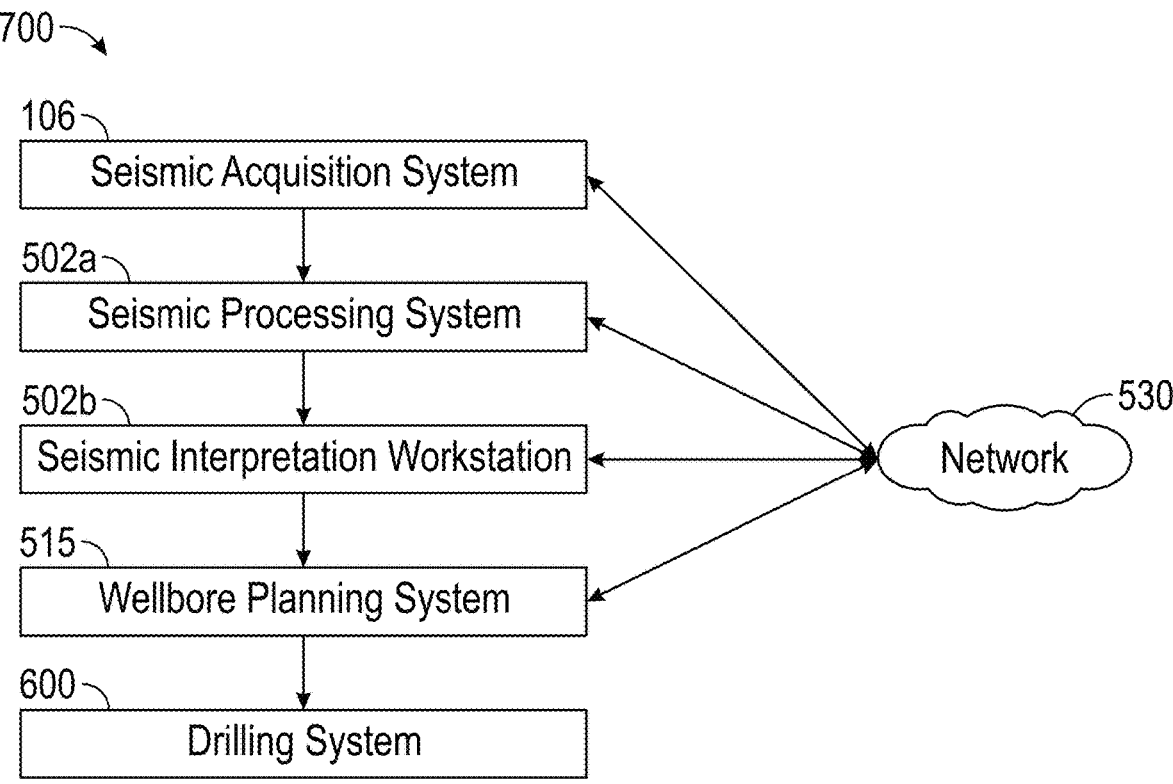
FIG. 7 illustrates systems in accordance with one or more embodiments.

FIG. 7 illustrates systems (700) in accordance with one or more embodiments. A seismic acquisition system (106) may be configured to obtain a seismic dataset for a subterranean region of interest (102) as described relative to FIG. 1.

The seismic dataset may be input into, stored on, and processed using a seismic processing system (502a) as described relative to FIG. 5. Processing may include attenuating artifacts and amplifying manifestations of geological boundaries (118) and a hydrocarbon reservoir (104) within the subterranean region of interest (102). Further, the seismic processing system (502a) may be used to perform the method described in FIG. 2 to model a wavefield (100) propagating through the subterranean region of interest (102). Further still, inversion may be performed using the seismic dataset and the modeled wavefield (100) to determine an updated velocity model (400). In turn, the updated velocity model (400) and the seismic dataset may be used to determine a seismic image.

The seismic image may be transferred to and stored on a seismic interpretation workstation (502b) via a network (530) as described relative to FIG. 5. The seismic image may then be displayed on the seismic interpretation workstation (502b). The seismic image may display the manifestations of geological boundaries (118) and the hydrocarbon reservoir (104) within the subterranean region of interest (102). A seismic interpreter may manually manipulate the displayed seismic image using the seismic interpretation workstation (502b) to identify and label the manifestations of the geological boundaries (118) and the hydrocarbon reservoir (104) within the subterranean region of interest (102).

The labeled seismic image may be loaded into a wellbore planning system (515) located on a memory (506) of a computer (502). A user of the computer (502) may use the labeled seismic image loaded into the wellbore planning system (515) to plan a wellbore path that penetrates the hydrocarbon reservoir (104).

The planned wellbore path may be loaded into a drilling system (600). The drilling system (600) may be configured to drill a wellbore (602) within the subterranean region of interest (102) along the planned wellbore path. Following drilling and completion of the wellbore (602), the wellbore (602) may be used to produce hydrocarbons from the hydrocarbon reservoir (104) to the surface of the earth (114).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
obtaining a wave equation that models a wavefield propagating through a subterranean region of interest,
    wherein the wave equation comprises a plurality of spatial partial differential equations, and
    wherein the subterranean region of interest is modeled using a plurality of grid nodes;
for each of the plurality of spatial partial differential equations:
    determining, using a computer processor, a linear system of equations using an approximate solution to each of the plurality of spatial partial differential equations at the plurality of grid nodes,
        wherein the linear system of equations comprises an inverse matrix, a first vector, and a second vector, and
        wherein the inverse matrix comprises a causal leaky integral and an anti-causal leaky integral,
    evaluating, using the computer processor, the inverse matrix comprising:
        evaluating a first portion of the inverse matrix using a first deconvolution filter; and
        evaluating a second portion of the inverse matrix using a second deconvolution filter, and
    evaluating, using the computer processor, the first vector using the evaluated inverse matrix and the second vector;
determining, using the computer processor, the wavefield using the evaluated first vector for each of the plurality of spatial partial differential equations, a velocity model for the subterranean region of interest, and the wave equation;
performing inversion comprising, until a convergence criterion is satisfied:
    determining an objective function based on the wavefield and a seismic dataset obtained for the subterranean region of interest,
    determining an extremum of the objective function, and
    updating the velocity model based on the extremum;

determining, using a seismic processing system, a seismic image of the subterranean region of interest using the seismic dataset and the updated velocity model;
identifying, using a seismic interpretation workstation, a depth of a hydrocarbon reservoir within the subterranean region of interest using the seismic image;
planning, using a wellbore planning system, a wellbore path directed towards the depth of the hydrocarbon reservoir as identified using the seismic image; and
drilling, using a drilling system, a wellbore to the depth of the hydrocarbon reservoir guided by the wellbore path.

2. The method of claim 1, wherein the wave equation comprises a second-order acoustic wave equation.

3. The method of claim 1, wherein the approximate solution comprises a recursive implicit second-derivative approximation.

4. The method of claim 1, wherein determining the linear system of equations further comprises inserting values for a plurality of coefficients into the approximate solution.

5. The method of claim 1, wherein determining the inverse matrix comprises applying a z-transform to a matrix within the linear system of equations.

6. The method of claim 1, wherein evaluating the first portion of the inverse matrix further comprises forward substitution.

7. The method of claim 1, wherein evaluating the second portion of the inverse matrix further comprises backward substitution.

8. A system comprising:
a seismic acquisition system configured to obtain a seismic dataset for a subterranean region of interest;
a seismic processing system configured to:
    receive a wave equation that models a wavefield propagating through the subterranean region of interest,
        wherein the wave equation comprises a plurality of spatial partial differential equations, and
        wherein the subterranean region of interest is modeled using a plurality of grid nodes,
    for each of the plurality of spatial partial differential equations:
        determine a linear system of equations using an approximate solution to each of the plurality of spatial partial differential equations at the plurality of grid nodes,
            wherein the linear system of equations comprises an inverse matrix, a first vector, and a second vector, and
            wherein the inverse matrix comprises a causal leaky integral and an anti-causal leaky integral;
        evaluate the inverse matrix comprising:
            evaluate a first portion of the inverse matrix using a first deconvolution filter, and
            evaluate a second portion of the inverse matrix using a second deconvolution filter; and
        evaluate the first vector using the evaluated inverse matrix and the second vector,
    determine the wavefield using the evaluated first vector for each of the plurality of spatial partial differential equations, a velocity model for the subterranean region of interest, and the wave equation,
    perform inversion comprising, until a convergence criterion is satisfied:
        determine an objective function based on the wavefield and the seismic dataset;
        determine an extremum of the objective function; and update the velocity model based on the extremum, and determine a seismic image of the subterranean region of interest using the seismic dataset and the updated velocity model;

a seismic interpretation workstation configured to identify a depth of a hydrocarbon reservoir within the subterranean region of interest using the seismic image;

a wellbore planning system configured to plan a wellbore path directed towards the depth of the hydrocarbon reservoir as identified using the seismic image; and a drilling system configured to drill a wellbore to the depth of the hydrocarbon reservoir guided by the wellbore path.

* * * * *